June 2, 197                                            3,515,484

Filed May 16, 1968

ROBERT H. deNORMAND
INVENTOR.

BY

AGENT

United States Patent Office 3,515,484
Patented June 2, 1970

3,515,484
ADJUSTABLE VACUUM CHUCK FOR HOLDING LENSES HAVING DIFFERENT RADII DURING OPTICAL EXAMINATION
Robert H. de Normand, Riga, N.Y., assignor to Bausch & Lomb Incorporated, Rochester, N.Y., a corporation of New York
Filed May 16, 1968, Ser. No. 729,723
Int. Cl. B25b 11/00
U.S. Cl. 356—124    6 Claims

ABSTRACT OF THE DISCLOSURE

An adjustable vacuum chuck for holding lenses having different radii during optical examination is provided in which a vacuum chamber configured as an axially extended annular space is formed between two telescoping tubular members. The lens to be examined is held on a seat which is formed by one end of each of the tubular members, the other end of the vacuum chamber is effectively sealed by an enlarged section of the inner tubular member. A hole is provided in the wall of the outer tubular member for connecting a vacuum pump to the vacuum chamber in the chuck. A beam of light, as from a laser, may be passed unobstructed through the inner member to optically examine the lens while it is being held.

BACKGROUND OF THE INVENTION

This invention is related to vacuum chucks for lenses and is more particularly concerned with adjustable vacuum chucks for holding lenses having different radii during optical examination.

With regard to the prior art, numerous lens chucks employing a vacuum to hold the lens to the chuck have been designed. U.S. Pat. 2,042,565, by E. D. Tillyer, provides such a chuck. Herein the lens is seated against a rubber pad on the lip of the vacuum chamber in which the opposite wall of the chamber is a transparent member so that a beam of light may be passed therethrough such that the lens may be optically aligned. However, in the present sophisticated optical instruments, the alignment problem is often too critical to allow an additional optical element to be present in the optical path. Today, the position tolerances in many lens systems are in the order of hundredth's of millimeters and in the future will become even more critical. Therefore, the additional element, the transparent plate, cannot be tolerated.

U.S. Pat. 2,352,180, by J. Bolsey, provides one possible approach to solving this problem. The light source for examining the lens is located internal to the chuck, thereby eliminating the need for the transparent plate. However, as shown in copending applications, Ser. No. 670,570, by E. M. Brockway and D. D. Nord and 704,297, by D. D. Nord, both of which are assigned to the same assignee as the present application, the present trend is toward the use of lasers for the light source due to the availability of a well collimated beam of monochromatic light where the lens may be moved independent of the beam of light. Therefore, a chuck of the type enclosing the light source would be prohibitively large and complex for general utility.

In addition, there are many lens chucks which grip the lens at the outside diameter; however, when a lens undergoes many operations, this surface is not available for gripping the lens.

SUMMARY OF THE INVENTION

Accordingly, it is an object of the present invention to provide a vacuum lens chuck which may be readily combined with lasers in the manner disclosed in the aforementioned copending applications for use in optically aligning lenses.

It is a second object to provide such a chuck which is adjustable to accommodate various lens configurations.

It is another object to provide such a chuck which is simple and economical to produce.

Briefly, the invention in its broadest aspect comprises an adjustable vacuum chuck for holding lenses having different radii during optical examination, the chuck including an outer tubular member and a telescoping inner tubular member slidable within the outer tubular member. Means are provided for locating the inner tubular member coaxially within the outer tubular member so that the inner wall of the outer tubular member and the outer wall of the inner tubular member define an axially extended annular space therebetween. The axially extending annular space extends from a first end of the pair of tubular members which define an adjustable seat for the lens so that a beam of light may pass axially through the inner tubular member to optically examine the lens. Sealing means is provided between the inner and outer tubular members at the opposite end of the axially extended annular space. Means are provided for connecting the axially extended annular space to a suitable depressurizing device whereby a partial vacuum may be drawn in the axially extended space thereby holding the lens in place.

DETAILED DESCRIPTION OF THE PREFERRED EMBODIMENTS

Figure 1:
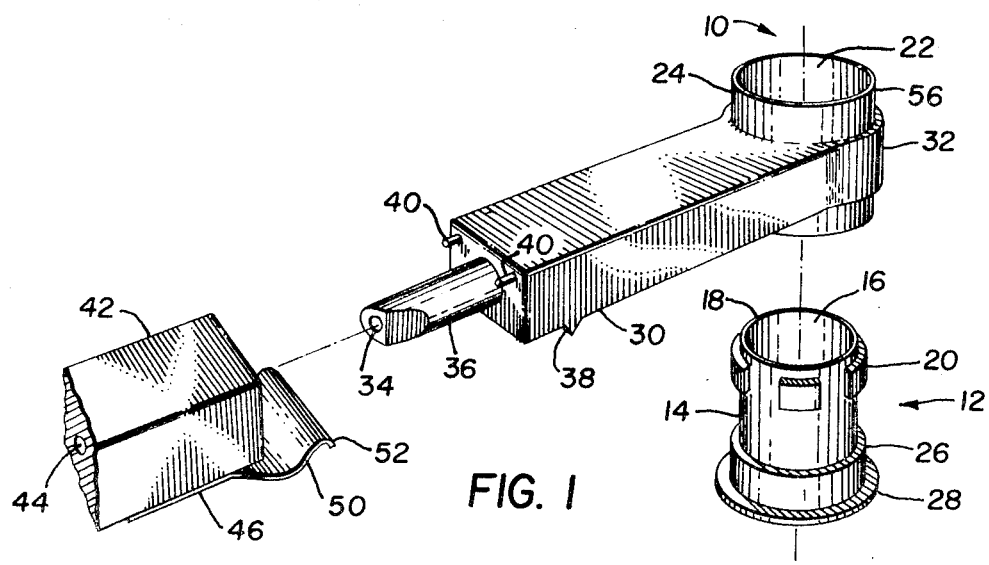
FIG. 1 is an exploded perspective view of apparatus embodying the invention.

In the following description of the aforementioned figures, like reference numerals refer to identical parts of the apparatus. Referring now to FIG. 1, there is shown an exploded perspective view of apparatus embodying the invention. An outer tubular member and an inner tubular member are shown and designated generally by numerals 10 and 12 respectively. The inner tubular member 12 is proportioned to slide in a telescoping manner within the outer member 10. The inner tubular member 12 has an unrestricted internal channel 16 passing therethrough. The inner tubular member 12 includes a central tubular section 14, one end of which forms a lip 18 against which a lens may be held in part as will be more fully explained hereinafter. Adjacent to lip 18 and spaced circumferentially around the central tubular section 14 are a plurality of radially extending projections 20. The projections 20 serve to locate the inner tubular member 12 coaxially in the internal channel 22 of sleeve 24 of the outer tubular member 10. At one end of sleeve 24, there is formed a lip 56, which cooperates with lip 18 to support a lens.

At the other end of the central tubular section 14 is a laterally enlarged section 26 which conforms closely to the internal channel 22 of the sleeve 24 and slides therein enhancing the locating function of the projections 20. Retaining flange 28 is attached to other end of section 26 to prevent the inner member 12 from sliding through sleeve 24 sufficiently to allow the projections 20 to extend beyond lip 56 on sleeve 24.

It will be appreciated that although the tubular members 10 and 12 are shown to be round, the invention disclosed herein is likewise applicable to tubular sections of other forms, for example, square or elipsoidal. The circular form is, however, preferred due to the far greater number of configurations which the chuck may hold. The other forms of the chuck are in the category of special purpose lens chucks.

Figure 2:
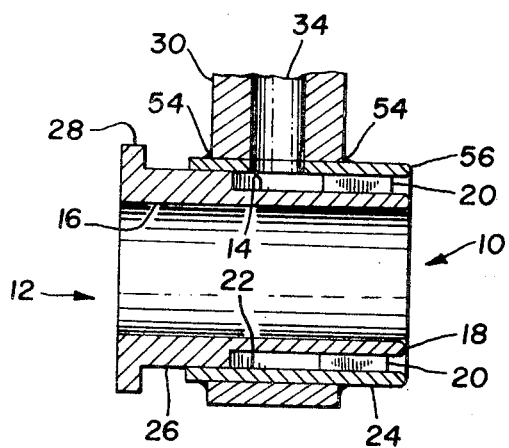
FIG. 2 is an enlarged longitudinal sectional view of the apparatus.
Figure 3:
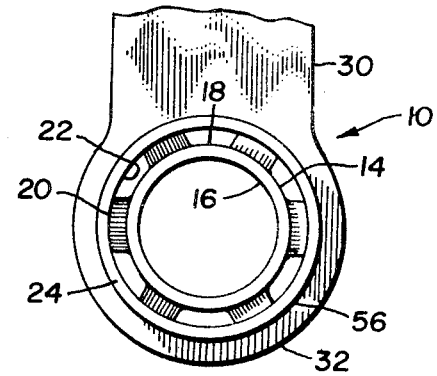
FIG. 3 is an enlarged end view of the apparatus.

Referring now more particularly to FIGS. 2 and 3, wherein the operation of the lens chuck may be more thoroughly explained, the tubular members 10 and 12 are shown assembled in an operational position. As shown, an axially extended annular space is formed between the central tubular section 14 and the internal channel 22 of the outer member 10, the axially extended annular space extends from the lips 18 and 56 to the laterally enlarged section 26 of the inner member 12.

The lens chuck is supported, in this embodiment, by means of a support arm 30 having a collar 32 which encircles the sleeve 24 and is attached to sleeve 24 by a suitable means 54 such as solder or cement. Extending axially through the arm 30 and radially through sleeve 24 into the axially extended annular space is a bore 34.

When a lens of any spherical or plano configuration is placed against lips 56 and 18, the axially extended annular space becomes a closed chamber except for the bore 34. If a vacuum pump or other suitable depressurizing device is connected to the space through bore 34, a vacuum chamber is formed therein; thereby holding the lens firmly against the lips 18 and 56. While so held, a beam of light may be projected through the internal channel 16 of the inner member 12 so that optical examination of the lens may occur.

As can be seen, due to the telescoping action of the inner member 12 within the outer member 10, the relative axial position of lip 18 to lip 56 may be widely varied. This action allows for the acceptance of many lens configurations by the chuck. When the two lips 18 and 56 are axially coincident, the chuck will accept a plano lens; when lip 18 extends beyond lip 56, the seat formed will accept a concave configuration; and when lip 18 is placed inside of sleeve 24, the seat accepts convex configurations. To further enhance this versatility, lips 18 and 56 are preferably rounded, so that each lip has line contact with the lens, although many other configurations of lips may be employed, for example, square or knife edges; however, the rounded lip form is preferred.

The laterally enlarged section 26 of the inner member 12 serves to seal the rear of the axially extended annular space by means of a close sliding fit between section 26 and internal channel 22. The seal may be improved where necessary, by the application of a sealant such as a silicone grease between section 26 and channel 22. This sealing function could, however, be performed in many different manners. For example, a resilient gasket could be placed between the two members to seal the vacuum chamber, or the seal might be effected by constricting the internal channel of the outer member.

The projections 20 serve merely to guide the inner member 12 coaxially in the outer member 10. This function also might be performed differently. The only restrictions on this locating means 20 are (1) that the chamber cannot be blocked by the means, and (2) the means cannot interfere with the lens placed on the seat.

The relative sizes and vacuum pressures to be used are a function of the size and weight of the lens to be examined, the area of the lens to be examined, the criticality of the measurements, and the magnitude of externally applied forces, if any.

Referring again to FIG. 1, the attachment means in this embodiment further include a male member 36 having bore 34 therethrough axially attached to arm 30. Member 36 is inserted into carriage member 42 of an apparatus utilizing the chuck, whereby various size chucks may be attached as required. Locating pins 40 are mounted on the end of arm 30 for radially locating arm 30 when inserted to member 42. Arm 30 also includes a detent 38 which mates with indentation 50 in spring 46 which is attached to member 42. Detent 38 is tapered to allow the outwardly projecting end 52 of spring 46 to slide over the detent upon engagement. Bore 34 is coaxial with bore 44 in member 42 whereby the connection may be made to a vacuum pump. It may be seen that other means of attachment of the chuck may be devised, for example, a thread could be cut on the outside of sleeve 24 such that a nut could attach the chuck to the required apparatus.

With reference to the aforementioned copending application, Ser. No. 704,297, an illustrative embodiment of a lens chuck of the type disclosed herein is shown in conjunction with other optical alignment apparatus. The beam of coherent monochromatic light is passed through a lens and the vacuum chuck to a photoreceptor. The divided beam of light is also compared interferometrically. If an additional element such as a piece of glass were included in the lens chuck as in the prior art, it would distort the information received by the photoreceptor and the operator's eyes. Therefore, the subject chuck accomplishes the function of holding a lens while presenting an obstruction free path through the chuck for light to pass.

While there has been shown and described what is considered to be the preferred embodiment of the present invention, it will be obvious to those skilled in the art that various changes and modifications may be made therein without departing from the invention as defined in the appended claims.

I claim:
1. An adjustable vacuum chuck for holding lenses having different radii during optical examination, the chuck comprising:
   an outer tubular member,
   a telescoping inner tubular member slidable within the outer tubular member,
   means for locating the inner tubular member coaxially within the outer tubular member,
   the inner wall of the outer tubular member and the outer wall of the inner tubular member defining an axially extended annular space therebetween, the axially extended annular space extending from a first end of the pair of coaxial tubular members, the first ends of the tubular members forming an adjustable seat for the lens so that a beam of light may pass axially through the inner tubular member to optically examine the lens,
   sealing means located between the inner and outer tubular members at the opposite end of the axially extended annular space, and
   means for connecting the axially extended annular space to a suitable depressurizing device whereby a partial vacuum may be drawn in the axially extended annular space thereby holding the lens in place.

2. An adjustable vacuum chuck as claimed in claim 1, wherein said outer and inner tubular members are round and said inner tubular member is concentric within said outer tubular member, and
   said chuck is further characterized by the inclusion of means for attaching said chuck to a machine.

3. An adjustable vacuum chuck as claimed in claim 2, wherein said sealing means is attached to said inner tubular member.

4. An adjustable vacuum chuck as claimed in claim 3, wherein said ends of the outer and inner tubular members forming a seat for said lens are rounded so that line contact is developed between each member and the lens, and
   said means for locating comprises a plurality of radially extending projections located on said inner tubular member adjacent to said lens seat.

5. An adjustable vacuum chuck as claimed in claim 4, wherein said means for connecting is formed in the wall of said outer tubular member, and said sealing means comprises a diametrically enlarged section of said inner tubular member, the diameter of the section being slightly smaller than the inside diameter of said outer tubular member to allow said inner tubular member to slide within said outer tubular member.

6. An adjustable vacuum chuck as claimed in claim 5 wherein said means for attaching and said means for connecting the chuck comprise a projecting bar member having an axially extending bore, the projection being attached to said outer tubular member adjacent to said axially extended annular space, the bore extending completely through the projection and the wall of said outer tubular member, and said inner tubular member being at least as long as said outer tubular member.

References Cited
UNITED STATES PATENTS 2,352,180    6/1944    Bolsey.

RONALD L. WILBERT, Primary Examiner

T. MAJOR, Assistant Examiner

U.S. Cl. X.R.

269—21; 350—178